United States Patent Office 3,491,034
Patented Jan. 20, 1970

3,491,034
COMPOSITION OF MATTER COMPRISING A POLYCARBONAMIDE AND CURED RUBBER FINES
Russell L. Seelig, Springfield, Mass., and John M. Mersereau, Cheshire, and Paul J. Mester, Stamford, Conn., assignors to Uniroyal, Inc., New York, N.Y., a corporation of New Jersey
No Drawing. Filed Oct. 30, 1967, Ser. No. 679,159
Int. Cl. C08g *41/04*
U.S. Cl. 260—3          5 Claims

ABSTRACT OF THE DISCLOSURE

A mixture of nylon with a small amount of vulcanized rubber fines which improves upon the physical properties of ordinary nylon.

---

The present invention relates to a novel composition of matter suitable for use as a molding composition.

Nylon is the generic name for the synthetic linear polyamides and includes, by way of example, such polymers as poly(hexamethylene adipamide) commonly known as nylon 66, polycaprolactam known as nylon 6, poly(hexamethylene sebacamide) known as nylon 610, and poly($\omega$-amino-undecanoic acid) known as nylon 11, etc. The nylon polymers are used for many varied applications, a few examples of which are mono-filament fishing yarns, fabric for wearing apparel, and plying with rubber in tires, gears, pipe fittings, wire covering and the like.

A prime disadvantage of nylon is its low modulus of elasticity relative to other rigid plastic polymers. The tensile strength and tensile impact of the nylon polymers are also often lower than desired.

It is an object of this invention to provide a new composition of matter having the desirable properties of nylon, but displaying a higher modulus of elasticity than pure nylon.

It is a further object of this invention to provide a practical molding composition generally similar to nylon, but superior thereto in tensile modulus, tensile strength and tensile impact.

Briefly speaking, the present invention concerns a novel composition of matter comprising from about 0.001 to about 0.5 part of vulcanized rubber fines and a corresponding 99.999 to 99.5 parts by weight of nylon. More particularly, the present invention concerns a novel molding composition comprising a homogeneous dispersion of said vulcanized rubber fines and said nylon.

The nylon used in forming the instant composition of matter is preferably one or more of the aforementioned polymers or heteropolymers of any of the monomers used to form any of the above-mentioned nylon polymers. The purity of the nylon used in forming the instant composition of matter is not critical as the improvement in physical properties resulting from the addition of vulcanized rubber fines will not be affected by the presence of other chemicals. However, the presence of low molecular weight materials, such as antioxidants should be limited to less than 2%. Thus even reclaimed nylon tire cord may be used in the present composition.

Similarly, the vulcanized rubber fines used in forming the instant composition of matter may contain the usual compounding ingredients and fillers as these do not interfere with the utility of the composition. Such fines may consist primarily of one or more hydrocarbon rubbers, such as natural rubber, styrene-butadiene copolymer rubber, butyl rubber, ethylene-propylene copolymer rubber, polybutadiene rubber, cis-polybutadiene rubber, cis-polyisoprene rubber and other rubbers conventionally used in tire manufacturing. For economical preparation vulcanized scrap tires may be used to prepare the rubber fines.

The sizes of the vulcanized rubber fines useful in the instant invention will vary, but preferably the fines are smaller than the openings of approximately a 100 mesh U.S. Standard Sieve Size screen (the sieve openings being about 0.0059 inch in the shortest distance across).

The novel composition is simply formed by adding from 0.001 to 0.5 part of the vulcanized rubber fines to corresponding 99.999 to 99.5 parts by weight of the nylon and then mixing the two in a plastic extruder or utilizing other similarly well-known processes for producing a homogeneous particle dispersion. The resultant composition is a practical molding composition, generally similar to nylon, but superior thereto in tensile modulus, tensile strength and tensile impact.

EXAMPLE 1

Vulcanized rubber fines were obtained by grinding vulcanized tire scrap (consisting of a major proportion of styrene-butadiene copolymer rubber and a minor proportion of natural rubber, as well as the customary amounts of carbon black and other commonly used rubber additives) obtained from a standard passenger tire and passing the fines through a 6 mesh U.S. Standard Sieve Size screen, the sieve openings being about 0.130 inch in the short-screened through a 100 mesh screen (the sieve openings being about 0.0059 inch across). The 100 mesh vulcanized rubber fines were then mixed at 550° F. with nylon 66 (technically called poly(hexamethylene adipamide)) in a screw-type thermoplastic extruder, the relative weight quantities of each being shown in Table 1. The mix was then cooled, granulated, and injection molded into standard ASTM (American Society for Testing and Materials) test specimens suitable for measuring physical properties. The test specimens were next suitably conditioned to assume a uniform moisture content by being allowed to come into equilibrium with a 50% relative humidity at 73° F. (about a 2% water content). The conditioned specimens were then tested for the physical properties noted in Table 1.

TABLE 1

|  | A | B | C | D | E | F | G | H |
|---|---|---|---|---|---|---|---|---|
| Wt. percent nylon | 100.000 | 99.999 | 99.990 | 99.900 | 99.800 | 99.500 | 99.000 | 98.000 |
| Wt. percent vulcanized rubber fines (100 mesh) | 0.000 | 0.001 | 0.010 | 0.100 | 0.200 | 0.500 | 1.000 | 2.000 |
| Tensile strength (ASTM D-412), p.s.i. | 7,100 | 7,400 | 7,560 | 7,790 | 7,710 | 7,620 | -------- | 7,630 |
| Tensile modulus (ASTM-D-412), p.s.i. × $10^{-5}$ | 1.2 | 1.3 | 1.3 | 1.3 | 1.4 | 1.6 | 1.2 | 1.2 |
| Tensile impact (ASTM D-1822-61T, using a type L bar), ft.-lbs./in.$^2$ | 175 | 210 | 198 | 231 | 263 | 216 | 149 | 131 |

The increased tensile strength, tensile modulus and tensile impact demonstrated for compositions having a 0.001 to 0.5 wt. percent level of fines enable molded parts to be produced which are more rigid and tougher than molded parts of comparable size made out of pure nylon. Alternatively, the improved physical properties of this new composition of matter may be utilized to produce a molded part comparable to a molded part of pure nylon in rigidity and strength, yet considerably reduced in thickness or cross-section.

It will be noted from the data of Table 1 that the tensile modulus and tensile impact advantages obtained by adding to the nylon small amounts of fines (0.001% and up, based on their combined weights) are lost somewhere above the 0.5 wt. percent level of fines. Although even at the 2% level of fines there is an improved tensile strength, the various compositions having a greater than 0.5 wt. percent level of fines demonstrate such serious surface imperfections (relative to pure nylon) as to obviate consideration thereof for use as practical molding compositions.

Many modifications and uses of this composition will now become apparent to those skilled in the art. Consequently, the spirit and scope of this invention should not be considered as defined by the foregoing disclosure or the desired embodiments with their specific percentages and compositions, but by the appended claims.

Having thus described our invention, what we claim and desire to protect by Letters Patent is:

1. A novel composition of matter comprising from 0.001 to about 0.5 part of vulcanized rubber fines having a diameter smaller than .0059 inch and a corresponding 99.999 to 99.5 parts by weight of a polycarbonamide having repeating carbonamide groups as an integral part of the polymer chain.

2. The composition of claim 1 wherein said vulcanized rubber fines are comprised of one or more of the rubbers selected from the group consisting of natural rubber, styrene-butadiene copolymer rubber, butyl rubber, ethylene-propylene copolymer rubber, polybutadiene rubber, cis-polybutadiene rubber and cis-polyisoprene rubber.

3. The composition of claim 1 wherein said polycarbonamide is selected from a group consisting of polycaprolactam, poly(hexamethylene adipamide), poly(hexamethylene sebacamide), poly(aminoundecanoic acid).

4. The composition of claim 1 wherein said vulcanized rubber fines are prepared from vulcanized scrap tires.

5. The composition of claim 1 wherein said polycarbonamide is reclaimed tire cord.

References Cited
UNITED STATES PATENTS

| | | | |
|---|---|---|---|
| 2,249,686 | 7/1941 | Dykstra | 260—857 |
| 2,809,944 | 10/1957 | Sverdrup | 260—2.3 |
| 2,853,742 | 9/1958 | Dasher | 260—2.3 |

SAMUEL H. BLECH, Primary Examiner

M. J. TULLY, Assistant Examiner

U.S. Cl. X.R.

260—2.3, 857